United States Patent Office 3,131,172
Patented Apr. 28, 1964

3,131,172
HOMOPOLYMERIZATION OF ACETYLENE WITH FERRIC CHLORIDE AS CATALYST
William G. Carpenter, Stamford, Conn., assignor to American Cyanamid Company, Stamford, Conn., a corporation of Maine
No Drawing. Filed Nov. 9, 1962, Ser. No. 236,698
3 Claims. (Cl. 260—94.1)

This invention relates to a process for polymerizing monomeric acetylene comprising heating said acetylene in the presence of ferric chloride dissolved in an inert organic solvent at a temperature of at least 110° C. and at a pressure of at least 185 lbs./sq. in.

One of the objects of the present invention is to polymerize acetylene. A further object of the present invention is to polymerize acetylene by using as a polymerization catalyst ferric chloride either in the anhydrous state or as the hexahydrate. These and other objects of the present invention will be discussed in greater detail hereinbelow.

In practicing the process of the present invention ferric chloride is dissolved in an inert organic solvent and monomeric acetylene is introduced into the solution and the reaction mass is heated to a temperature of at least 110° C. and at an absolute pressure of at least 185 lbs./sq. in. The catalytic material may be either anhydrous ferric chloride or ferric chloride hexahydrate. The amount of the catalyst used may be varied from about 5% to about 40% by weight based on the weight of acetylene used in the system. Preferably one would use between about 10% and 30% by weight based on the weight of acetylene used in the system. Amounts of the ferric chloride in excess of 40% may be used although not to any advantage and the solubility of the ferric chloride compound in the solvent should be considered when the upper limits of the amount to be used are being determined.

In order to have a suitable medium available for the acetylene to contact the ferric chloride compound it is necessary to make use of an organic solvent which is substantially completely inert to the acetylene and to the ferric chloride compound under the conditions of polymerization. It is apparently necessary for the inert organic solvent to be used to have a comparatively high boiling point inasmuch as the lower limit of the temperature used in the process is 110° C. Therefore the inert organic solvent should have a boiling point greater than 110° C. at the pressure employed. No upper limit on the boiling point of the inert organic solvent need be observed so long as the solvent is liquid under the reaction conditions both with respect to the lower limit and the upper limit. Among those solvent that may be used are: dioxane, dimethoxy ethane, hexamethyl phosphoramide, tetrahydrofuran, as well as high boiling ethers, high boiling glycols, high boiling monohydric alcohols and the like. The amount of solvent used will be without limit and will depend on and will vary directly with the size of the polymerization operation. For small batches relatively small amounts of solvent will be used while for large batches large amounts of solvent will be used. In a continuous process, the catalyst may be predissolved in the inert organic solvent and preheated to the reaction temperature and introduced into a polymerization sphere with the acetylene successively or concurrently so as to achieve polymerization. For reasons of safety the maximum tolerable pressure should not exceed about 340 p.s.i. The upper limit of temperature should not exceed that temperature at which the maximum pressure is exerted.

In order that the concept of the present invention may be more completely understood the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a stainless steel autoclave there is introduced 11 parts of acetylene, 100 parts of tetrahydrofuran and 4 parts of anhydrous ferric chloride. The autoclave is placed in an electric rocking device and heated with constant shaking up to 118° C. over a period of 24 hours to reach a pressure of 300 p.s.i., thereupon the pressure decreased 185 p.s.i. to 115 p.s.i. When this substantial pressure drop is observed, the autoclave is opened and the reaction product is removed, filtered and washed consecutively with water, ethanol and ether to yield 11 parts of a black solid. An infrared spectrum of this material exhibited two bands at 3015 and 1010 cm.$^{-1}$. The material is identified as polyacetylene. The polyacetylene material produced contained only 0.80% of nitrogen indicating very little absorption of atmospheric gases.

Example 2

Into a suitable autoclave as in Example 1 there is introduced 12 parts of acetylene, 4 parts of anhydrous ferric chloride and 100 parts of tetrahydrofuran. The autoclave is sealed and heated up to 150° C. over a period of 24 hours in order to develop a pressure of 185 p.s.i. On observing a substantial pressure drop the autoclave is cooled, opened and the reaction mixture removed. The reaction mixture is filtered and washed as in Example 1 to produce 2.15 parts of polyacetylene (a yield of 18%). An infrared spectrum of the product contained a weak band at 3015 cm.$^{-1}$ and a strong band at 1015 cm.$^{-1}$.

Example 3

Into a suitable autoclave as in Example 1 there is introduced 9 parts of acetylene, 4 parts of ferric chloride hexahydrate and 100 parts of tetrahydrofuran. The autoclave is heated up to 146° C. over a period of 27 hours with a pressure build-up to 200 p.s.i. 6.0 parts of polyacetylene was produced (a yield of 67%). The product is identified by an infrared spectrum with weak bands at 3015 cm.$^{-1}$ and strong bands at 1015 cm.$^{-1}$.

I claim:
1. A process for homopolymerizing acetylene comprising heating monomeric acetylene in the presence of ferric chloride dissolved in an inert organic solvent at a temperature of at least 110° C. and at a pressure of at least 185 lbs./sq. in.
2. A process for homopolymerizing acetylene comprising heating monomeric acetylene in the presence of anhydrous ferric chloride dissolved in an inert organic solvent at a temperature of at least 110° C. and at a pressure of at least 185 lbs./sq. in.
3. A process for homopolymerizing acetylene com- prising heating monomeric acetylene in the presence of ferric chloride hexahydrate dissolved in an inert organic solvent at a temperature of at least 110° C. and at a pressure of at least 185 lbs./sq. in.

References Cited in the file of this patent

UNITED STATES PATENTS

| | | |
|---|---|---|
| 2,485,454 | Nelson et al. | Oct. 18, 1949 |
| 2,932,633 | Juveland et al. | Apr. 12, 1960 |

FOREIGN PATENTS

| | | |
|---|---|---|
| 570,538 | Canada | Feb. 10, 1959 |

OTHER REFERENCES

Moller: Inorganic Chemistry, pages 103–105, Wiley (1952).

Calloway: Chemical Reviews, volume 17, pages 327–383 (1935).